United States Patent [19]
Kimura et al.

[11] Patent Number: 5,945,771
[45] Date of Patent: Aug. 31, 1999

[54] VIBRATION WAVE DRIVEN MOTOR AND A PRINTING APPARATUS

[75] Inventors: Atsushi Kimura, Yokohama; Eiichi Yanagi, Inagi; Yoshifumi Nishimoto, Yokohama; Hiroyuki Seki, Urawa; Shinji Yamamoto, Tokyo, all of Japan

[73] Assignee: Canon Kabushiki Kaisha, Tokyo, Japan

[21] Appl. No.: 08/926,464

[22] Filed: Sep. 10, 1997

Related U.S. Application Data

[63] Continuation of application No. 08/518,227, Aug. 23, 1995, abandoned, which is a continuation of application No. 08/183,302, Jan. 19, 1994, abandoned.

[30] Foreign Application Priority Data

Jan. 22, 1993 [JP] Japan .................................. 5-009391

[51] Int. Cl.⁶ .................................................. H01L 41/08
[52] U.S. Cl. ..................... 310/323.05; 310/323.02; 310/323.07
[58] Field of Search ..................... 310/323, 328

[56] References Cited

U.S. PATENT DOCUMENTS

| | | | |
|---|---|---|---|
| 4,672,256 | 6/1987 | Okuno et al. | 310/323 |
| 4,692,650 | 9/1987 | Okumura et al. | 310/323 |
| 4,692,651 | 9/1987 | Hiramatsu et al. | 310/323 |
| 4,752,711 | 6/1988 | Tsukimoto et al. | 310/323 |
| 4,831,305 | 5/1989 | Mukohjima et al. | 310/323 |
| 4,914,338 | 4/1990 | Murakami | 310/323 |
| 5,028,833 | 7/1991 | Kawai | 310/323 |
| 5,066,884 | 11/1991 | Takagi et al. | 310/323 |
| 5,099,167 | 3/1992 | Kimura et al. | 310/323 |
| 5,128,580 | 7/1992 | Maeno et al. | 310/323 |
| 5,140,214 | 8/1992 | Kimura et al. | 310/323 |
| 5,155,407 | 10/1992 | Kimura et al. | 310/323 |
| 5,180,941 | 1/1993 | Seki et al. | 310/323 |
| 5,192,890 | 3/1993 | Kimura et al. | 310/323 |
| 5,204,577 | 4/1993 | Watanabe et al. | 310/323 |
| 5,216,314 | 6/1993 | Suzuki | 310/323 |
| 5,241,234 | 8/1993 | Seki et al. | 310/323 |
| 5,313,132 | 5/1994 | Nakanishi | 310/323 |
| 5,327,040 | 7/1994 | Sumihara et al. | 310/323 |

FOREIGN PATENT DOCUMENTS

| | | | |
|---|---|---|---|
| 0435496 | 7/1991 | European Pat. Off. . | |
| 0475752 | 3/1992 | European Pat. Off. . | |
| 0530822 | 3/1993 | European Pat. Off. . | |
| 0575080A1 | 12/1993 | European Pat. Off. | 310/323 |
| 60-230882 | 11/1985 | Japan . | |
| 331137 | 2/1991 | Japan . | |
| 3155375 | 7/1991 | Japan . | |

OTHER PUBLICATIONS

European Search Report dated May 16, 1994.

*Primary Examiner*—Mark O. Budd
*Attorney, Agent, or Firm*—Fitzpatrick, Cella, Harper & Scinto

[57] ABSTRACT

The distal end of a flange of a stator serving as a contact member is located on the outer peripheral side of one linear portion of an elastic member serving as a vibration member, and the inner peripheral side of this linear portion of the elastic member is located on the proximal side of the flange. The ratio of the response amplitude of the flange of the stator to the amplitude of the elastic member is kept almost constant in all areas of contact portions between the two members.

28 Claims, 7 Drawing Sheets

B PORTION

C PORTION

B PORTION

C PORTION

VIBRATION WAVE DRIVEN MOTOR AND A PRINTING APPARATUS

This application is a continuation of application Ser. No. 08/518,227 filed Aug. 23, 1995 now abandoned, which is a continuation of application Ser. No. 08/183,302 filed Jan. 19, 1994, both now abandoned.

BACKGROUND OF THE INVENTION

1. Field of the Invention

The present invention relates to a vibration wave driven motor and, more particularly, to a vibration wave driven motor of a type in which an elastic member along which a travelling wave is generated is kept in tight contact with a rail-like stator, and the elastic member is moved along the rail-like stator, and a printing apparatus using this vibration wave driven motor.

2. Related Background Art

A conventional vibration wave driven motor of this type is shown in FIGS. 11 and 12.

An elastic member 1 consists of a metal material and has a projection 1a on a sliding surface side. An AC voltage is applied to piezoelectric elements 2 bonded to the upper surface of the elastic member 1 to generate a travelling vibration wave therein. The principle of generating the travelling vibration wave and the structure of the piezoelectric elements 2 are known, and a detailed description thereof will be omitted. AC voltages having a 90° phase difference in time are applied to two drive piezoelectric element groups spaced apart from each other at an angular interval of 90°, thereby generating a travelling vibration wave. A rail-like stator 8 is in frictional contact with the elastic member 1 and is fixed on a bottom plate 9 of a motor case. The rail-like stator 8 is kept in contact with the elastic member 1 through a vibration insulating material 5 (e.g., a felt) by a pressure spring 3.

A plate-like auxiliary support 6 is bonded to a projection 1b formed at one linear portion of the elastic member 1 and supports a table 4, so that the elastic member 1 can linearly move smoothly together with the table 4 without cluttering. The contact width between the elastic member 1 and the rail-like stator 8 is set large to reduce the rigidness of the plate-like auxiliary support 6. Hence, the elastic member 1 conforms to the frictional surface of the rail-like stator, thereby stably moving the elastic member 1.

The rail-like stator 8 has a flange 8a to softly receive the vibration of the elastic member 1. That is, the rail-like stator 8 has spring properties.

This motor is used for driving a printing head in a printer of, e.g., a bubble jet scheme. The printing head is mounted on a carriage (not shown) mounted on the table 4 to linearly reciprocate the printing head.

The amplitude of the vibration of the elastic member 1 in a Z direction is large in its outer peripheral portion in the conventional example and small in its inner peripheral portion, as shown in FIG. 13. To the contrary, the vibrations at the flange 8a of the rail-like stator 8 have amplitudes opposite to those of the elastic member 1. As shown in FIG. 13, when the elastic member is set in a state 100, the flange 8a is set in a state 800a. Only the outer peripheral portion (edge) of the elastic member is in contact with the flange. In this state, the contact width is small, and a stable contact state cannot be obtained. In some cases, the distal end of the flange is brought into contact with or separated from the inner periphery of the elastic member 1 to generate noise. In addition, the contact portion is the proximal portion of the flange, and the spring properties of the flange cannot be sufficiently exhibited. As a result, the vibrations of the elastic member cannot be received softly and noise is generated.

Even if the elastic member is in contact with the flange 8a from the outer to inner peripheries, the contact state between the elastic member and the flange 8a is not always uniform, and the sliding loss is large, thereby decreasing the feed velocity of the table 4.

If the above adverse influences are to be eliminated by reducing the contact width between the elastic member 1 and the flange 8a of the rail-like stator 8, as shown in FIG. 14, the position of the elastic member 1 in a $B_Z$ direction becomes unstable because in dimensional errors of each of the parts. As a result, stable feeding cannot be performed.

SUMMARY OF THE INVENTION

It is an object of the present invention to provide a vibration wave driven motor which generates minimal noise and achieves high-speed stable movement of an elastic member.

It is another object of the present invention to provide a printing apparatus for realizing high-speed, high-precision printing with a low noise level.

An aspect of the present invention is to set a constant ratio of the amplitude of a rail-like stator to the amplitude of an elastic member throughout the entire contact area, thereby reducing noise of the elastic member and achieving high-speed movement of the elastic member.

DETAILED DESCRIPTION OF THE PREFERRED EMBODIMENTS

Figure 1:
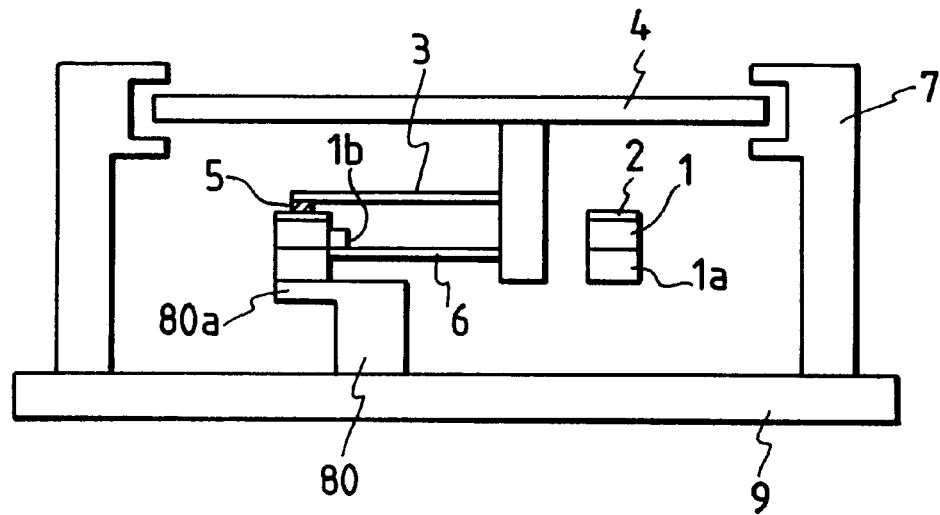
FIG. 1 is a side view showing a first embodiment of the present invention.

The present invention will be described in detail with reference to illustrated embodiments. The same reference numerals as in the prior art embodiments denote the same parts in the following embodiments, and a detailed description thereof will be omitted.

Figure 2:
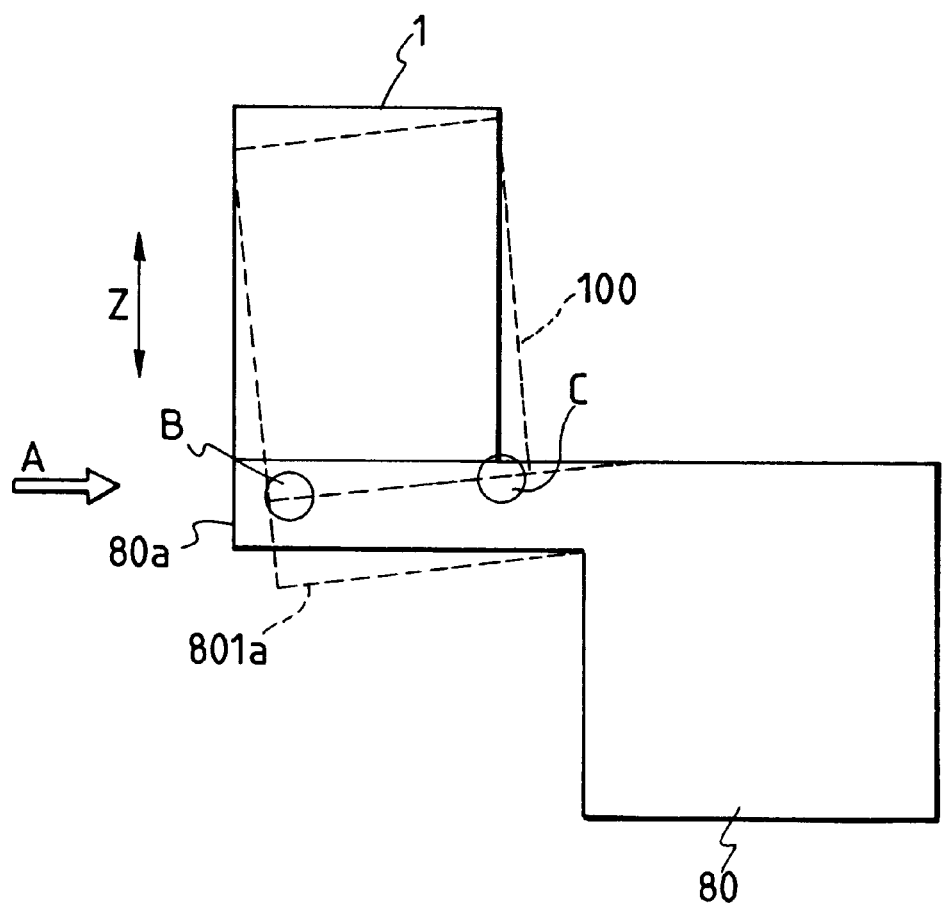
FIG. 2 is a view showing the main part in FIG. 1.
Figure 3A:
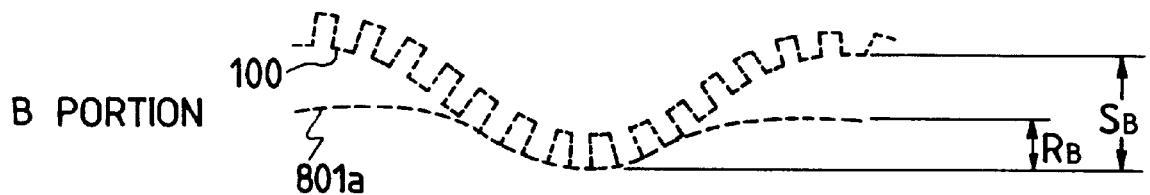
FIGS. 3A and 3B are views showing contact states between an elastic member 1 and a rail-like stator 80.
Figure 3B:
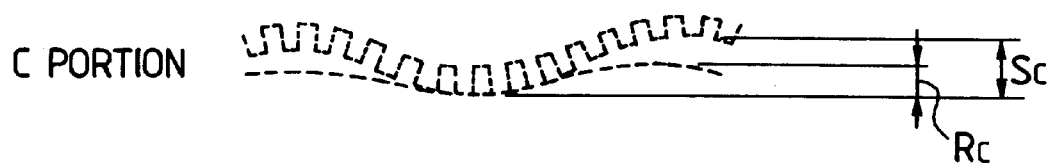
Figure 11:
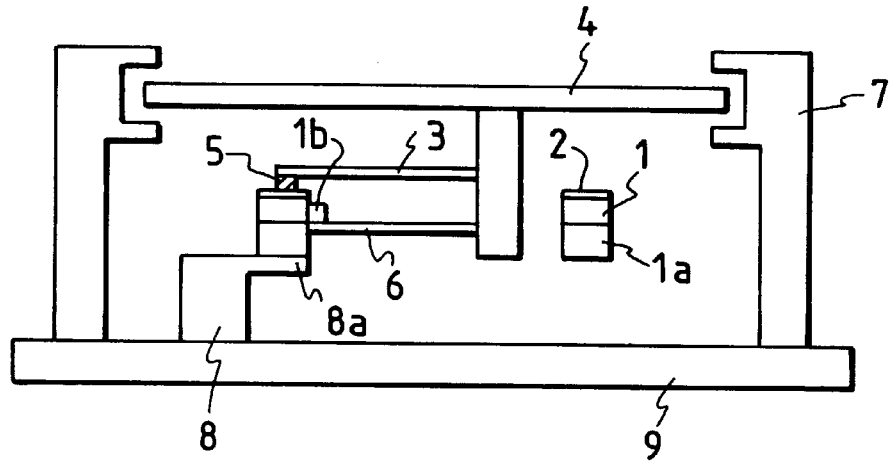
FIG. 11 is a side view showing a conventional vibration wave driven motor.
Figure 12:
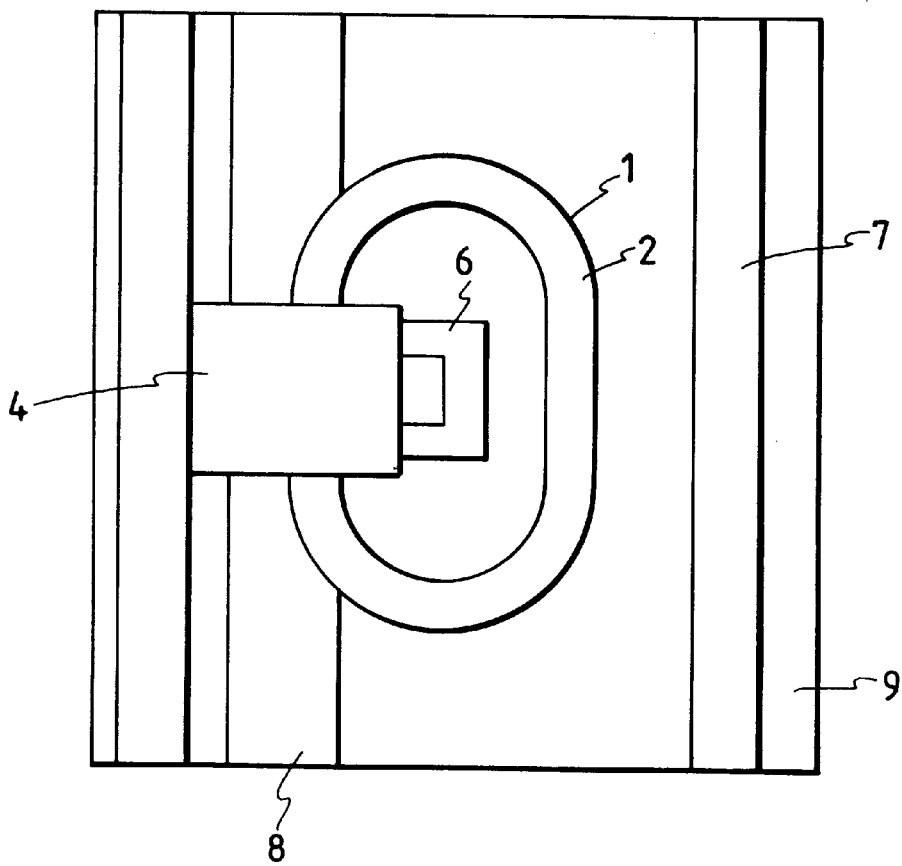
FIG. 12 is a plan view showing the conventional vibration wave driven motor.
Figure 13:
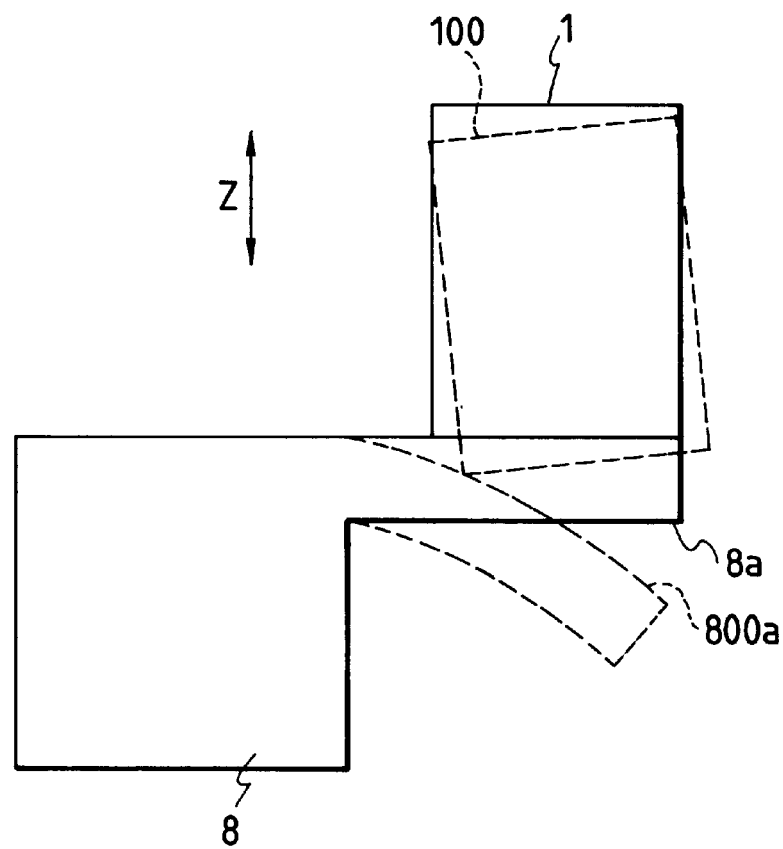
FIG. 13 is a view showing a main part in FIG. 11.
Figure 14:
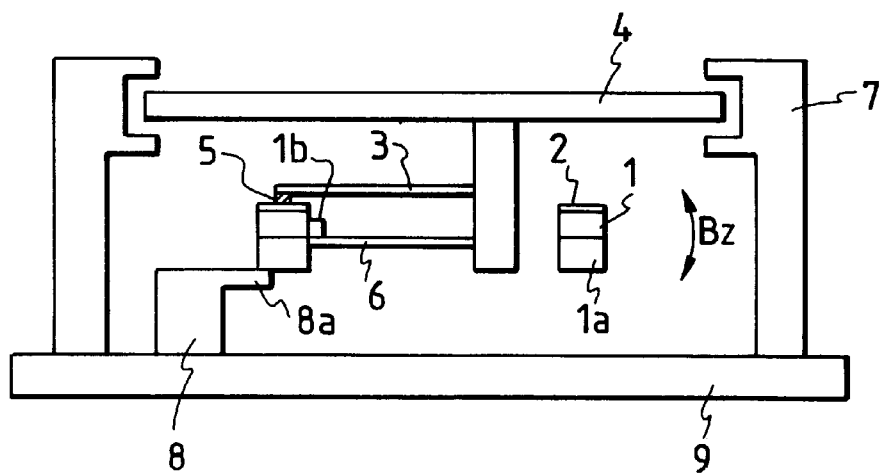
FIG. 14 is a side view showing another conventional vibration wave motor.

FIG. 1 is a schematic view showing the main part of a bubble jet printer according to the first embodiment of the present invention. In this embodiment, a rail-like stator 80 is located in a state reverse to that in FIG. 11. The distal end of a flange 80*a* is located on the outer peripheral side of one linear portion of an elastic member 1. The inner peripheral side of the linear portion of the elastic member 1 is located on the proximal side of the flange 80*a*. FIG. 2 shows a vibrated state between the elastic member 1 and the flange 80*a* of the rail-like stator 80. FIGS. 3A and 3B show contact portions, i.e., B and C portions of the elastic member 1 and the rail-like stator 80 viewed from an A direction, respectively. Referring to FIGS. 3A and 3B, the flange 80*a* has response amplitudes $R_B$ and $R_C$ in a Z direction (See FIG. 2). The elastic member 1 has amplitudes $S_B$ and $S_C$ in the Z direction (See FIG. 2). These amplitudes satisfy the condition $R_B/S_B \approx R_C/S_C$. The ratio R/S of the response amplitude R of the flange of the rail-like stator 80 to the amplitude S of the elastic member 1 is kept almost constant in almost all the contact portions between the elastic member 1 and the stator 80 in addition to the above-mentioned contact portions, i.e., the B and C portions, as a matter of course.

Figure 4A:
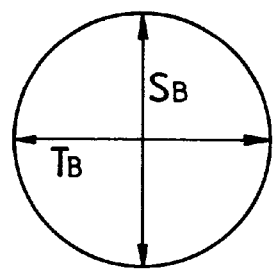
FIGS. 4A and 4B are views showing elliptical loci of the elastic member 1.
Figure 4B:
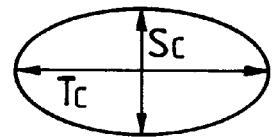

FIGS. 4A and 4B show the elliptical loci of the mass points of the B and C portions of the elastic member 1. As will be apparent from FIGS. 4A and 4B, since the amplitudes in the feed direction are equal to each other ($T_B=T_C$) although the amplitudes in the Z direction are different from each other ($S_B \neq S_C$), the sliding loss is reduced for $R_B/S_B \approx R_C/S_C$. Therefore, increasing the contact width does not reduce the velocity. Although noise may be generated unless the ratio R/S is equal to or greater than a predetermined value, the velocity is reduced with a larger ratio R/S. If $R_B/S_B \neq R_C/S_C$, then a condition for inhibiting noise must be satisfied for a minimum ratio R/S. Therefore, the velocity becomes lower than that for $R_B/S_B \approx R_C/S_C$.

When the R/S is kept almost constant in the entire area of the contact portions, the elastic member 1 can be moved at high speed without any noise. In addition, since the contact state is stable, stable driving can be performed. More specifically, if the contact width, the amplitude $S_B$ of the elastic member 1 in the Z direction, the amplitude $S_C$, and the material of the flange 80*a* are 4 mm, 2 $\mu$mP-P (peak-to-peak), about 0.5 to 1 $\mu$mP-P, and an aluminum alloy, respectively, then the flange 80*a* has a length (l) of 4.5 to 6 mm and a thickness (t) of about 1.5 to 3 mm.

Figure 5:
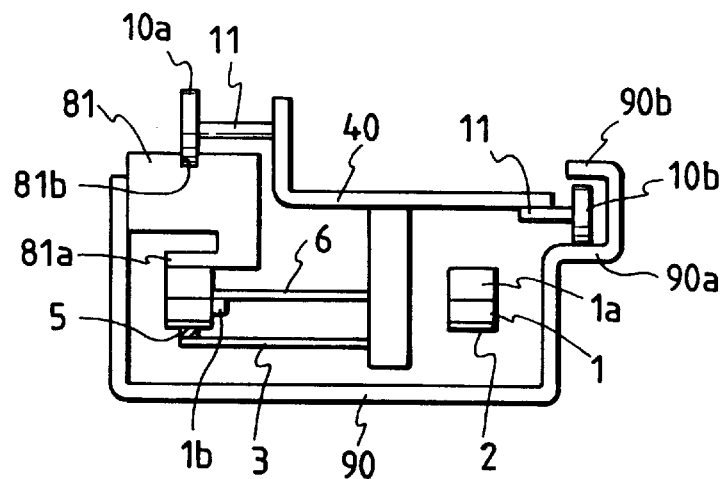
FIG. 5 is a side view showing a second embodiment of the present invention.
Figure 6:
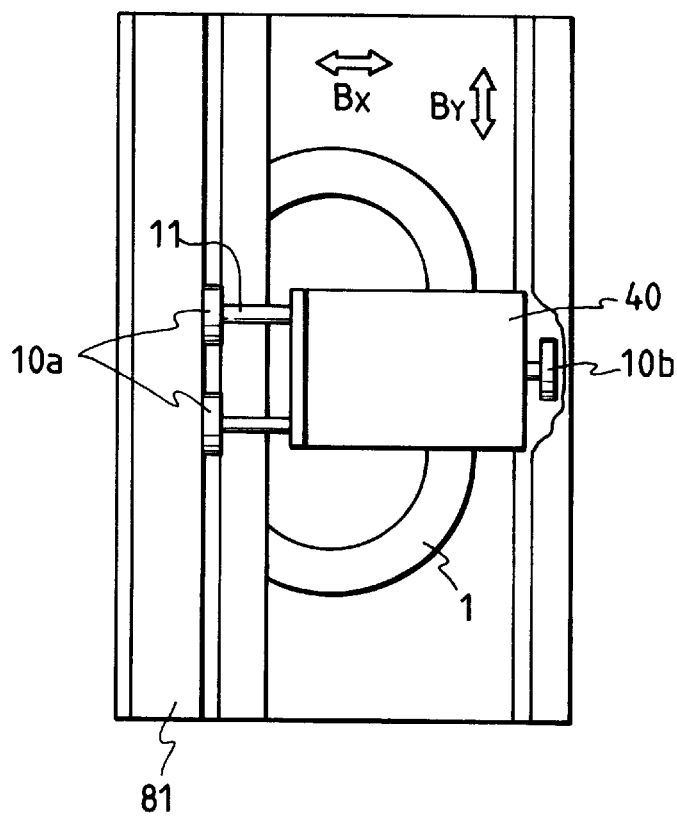
FIG. 6 is a plan view showing the second embodiment of the present invention.

FIGS. 5 and 6 show the second embodiment of the present invention. An elastic member 1 is fixed to a table 40 through a plate-like auxiliary support 6. A rail-like stator 81 is fixed to one side of a bottom plate 90. Two bearing shafts 11 are fixed on the table 40 along a $B_Y$ direction, and rollers 10*a* are mounted at the distal ends of the bearing shafts 11, respectively. A recessed groove 81*b* in which the rollers 10*a* are fitted is formed in the upper surface of the rail-like stator 81. The recessed groove 81*b* inhibits movement of the elastic member 1 in a $B_x$ direction. A flange 81*a* having spring properties is formed on the lower surface opposing the upper surface of the rail-like stator 81. The lower surface of the flange 81*a* serves as a sliding surface which is brought into contact with a drive surface of the elastic member 1. The flange 81*a* has the same properties as in the first embodiment. That is, the ratio of the response amplitude of the flange to the amplitude of the elastic member in the entire contact area is kept almost constant.

A guide portion 90*a* constituted by a flat surface along the $B_Y$ direction is formed on the other side of the bottom plate 90. A roller 10*b* mounted on bearing shafts 11 fixed to the table 40 is in contact with the guide portion 90*a*. A regulation portion 90*b* parallel to the guide portion 90*a* is formed at the upper portion of the guide portion 90*a* so as to be spaced apart from the roller 10*b* by a small gap. The regulation portion 90*b* limits vertical movement of the roller 10*b*.

As described above, if all the bearings are constituted by rollers, then the bearing resistance can be lower than that of the first embodiment, and the motor output can be increased.

Figure 7:
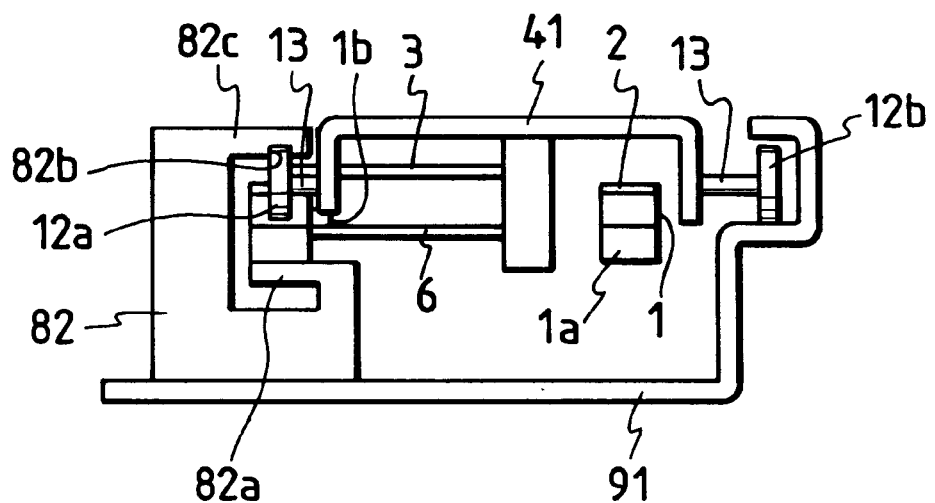
FIG. 7 is a side view showing a third embodiment of the present invention.

FIG. 7 shows the third embodiment of the present invention. A second flange 82*c* is formed in a rail-like stator 82 to oppose a flange 82*a* contacting an elastic member 1. A recessed groove 82*b* is formed in the lower surface of the second flange 82*c*, and a roller 12*a* is fitted in the recessed groove 82*b*, thereby obtaining a low-profile structure as compared with that in FIG. 5.

Figure 8:
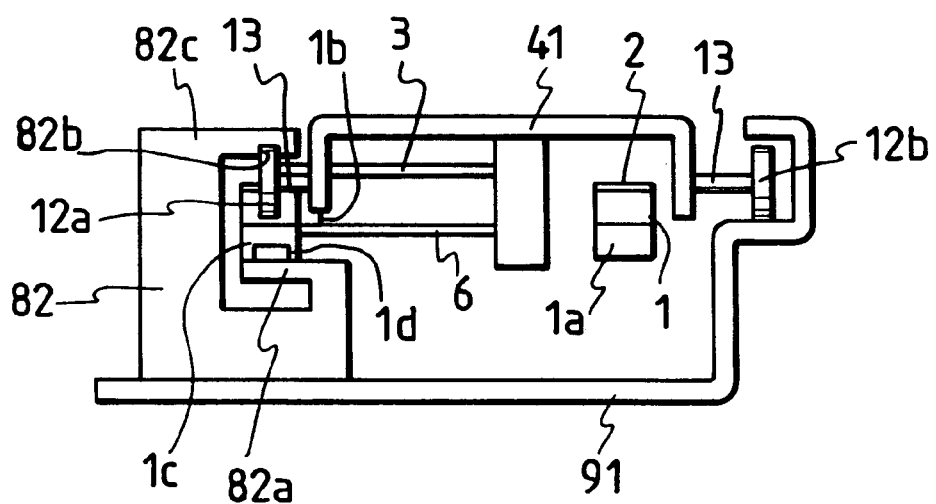
FIG. 8 is a side view showing a fourth embodiment of the present invention.

FIG. 8 shows the fourth embodiment of the present invention. Only an outer peripheral portion 1*c* and an inner peripheral portion 1*d* of one linear portion of an elastic member 1 are in contact with a flange 82*a* of a rail-like stator 82 due to the following reason. It is much easier to set a constant ratio of the response amplitude of the flange to the amplitude of the elastic member in only the outer and inner peripheral portions than in the entire area from the outer peripheral side to the inner peripheral side, as shown in FIG. 7.

Figure 9:
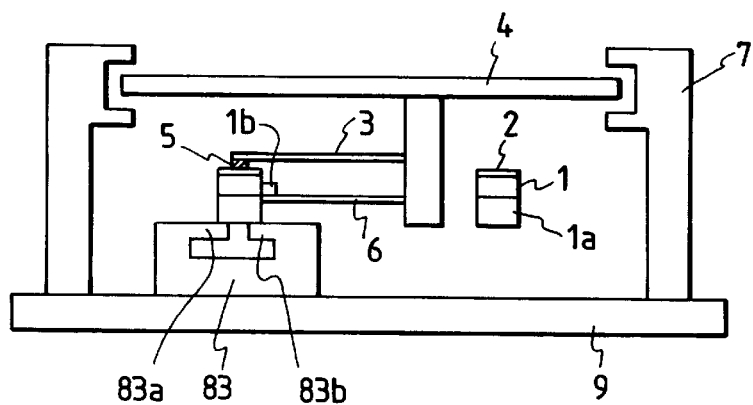
FIG. 9 is a side view showing a fifth embodiment of the present invention.

FIG. 9 shows the fifth embodiment of the present invention. The outer peripheral portion of one linear portion of an elastic member 1 is in contact with a first flange 83*a*, and the inner peripheral portion of the elastic member 1 is in contact with a second flange 83*b*. In this case, unless the contact width is kept small, the ratio of the response amplitude of the flange to the amplitude of the elastic member cannot be kept constant in the entire contact area.

Figure 10:
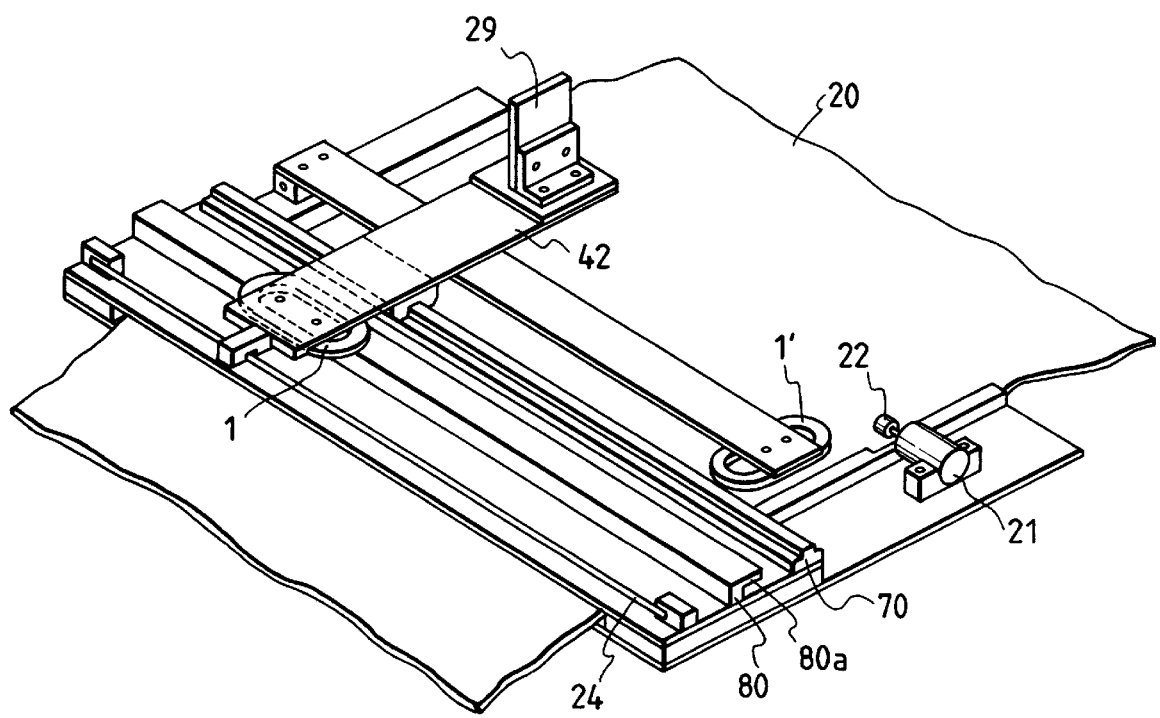
FIG. 10 is a perspective view showing an arrangement of a printing apparatus using a vibration wave driven motor according to the present invention.

FIG. 10 is a perspective view of a bubble jet printing apparatus using the above vibration wave driven motor. A printing head 29 is mounted on a carriage 42 to eject an ink to print information on a paper sheet fed by a paper feed vibration wave driven motor 1' (disclosed in Japanese Laid-Open Patent Application No. 3-31137). An encoder slit plate 24 is formed to control the feed velocity of the carriage. A paper feed amount detection rotary encoder 21 is rotated by a roller 22 brought into tight contact with the upper surface of a paper sheet 20.

In the above description, an elastic member is moved along a rail-like stator. However, a rotary type, a type in which an elastic member is stationary and a stator is movable, or any other type is applicable herein.

As has been described above, according to the present invention, the ratio of the response amplitude of a rail-like stator to the amplitude of an elastic member is kept almost constant in all of the contact areas (i.e., from the outer peripheral portion to the inner peripheral portion of the elastic member). Therefore, the elastic member can be moved stably at high speed without any noise.

The above vibration wave driven motor is utilized as a drive source for driving a printing head or the like to perform high-speed, high-precision printing without any noise.

What is claimed is:
1. A vibration driven motor, comprising:
   a vibration member that generates a vibration wave therein, the vibration member having a contact portion, and the vibration wave having a displacement amplitude; and
   a contact member having a contact portion in frictional contact with the contact portion of said vibration member, such that the vibration wave in said vibration member generates a vibration in the contact member having a response displacement amplitude and causes relative movement between said vibration member and said contact member, said contact member including means for maintaining a ratio of the response displacement amplitude of the vibration generated in said contact member to the displacement amplitude of the vibration wave in said vibration member substantially constant over an entire contact area between the contact portion of said vibration member and the contact portion of said contact member.

2. A motor according to claim 1, wherein said vibration member comprises an elastic member having a pair of linear portions and a pair of arcuate portions, so that one of said linear portions of said elastic member is in contact with said contact portion of said contact member and is moved along said contact member by the vibration wave.

3. A motor according to claim 2, wherein an outer peripheral side of one of said linear portions of said elastic member is located at a distal end portion of a flange formed on said contact member, and an inner peripheral side of said one linear portion is located on a side proximal to said distal end portion of said flange.

4. A motor according to claim 2, wherein an outer peripheral side of one of said linear portions of said elastic member is in contact with a first flange of said contact member, and an inner peripheral side of said one linear portion is in contact with a second flange of said contact member.

5. A printing apparatus using said vibration wave driven motor defined in claim 1 as a drive source.

6. A printing apparatus using said vibration wave driven motor defined in claim 2 as a drive source.

7. A printing apparatus using said vibration wave driven motor defined in claim 3 as a drive source.

8. A printing apparatus using said vibration wave driven motor defined in claim 4 as a drive source.

9. A vibration driven actuator comprising:
a vibration member that generates a vibration wave therein, said vibration member having a first contact portion and a second contact portion in a contact area, said first contact portion being located at a supported proximal portion of said vibration member and the second contact portion being located at a distal portion of said vibration member; and
a contact member in frictional contact with said vibration member and having a first contact portion and a second contact portion in the contact area for contacting the respective first and second contact portions of said vibration member, the first contact portion being located at a supported proximal Portion of said contact member and the second contact portion being located at a distal portion of said contact member, the second contact portion of said contact member being more deformable than the first contact portion of said contact member, such that the vibration wave causes relative movement between said vibration member and said contact member and a vibration displacement amplitude of the second contact portion of said vibration member is larger than a vibration displacement amplitude of the first contact portion of said vibration member.

10. An actuator according to claim 9, wherein said contact area of said contact member is supported in a cantilever manner.

11. An actuator according to claim 9, wherein said vibration member includes at least a linear portion and an arcuate portion.

12. A system using the actuator defined in claim 9 as a drive source.

13. A printing apparatus using the actuator defined in claim 9 as a drive source.

14. A system using the actuator defined in claim 10 as a drive source.

15. A printing apparatus using the actuator defined in claim 10 as a drive source.

16. A vibration driven actuator comprising:
a vibration member that generates a vibration wave therein, said vibration member having a first contact portion and a second contact portion in a contact area; and
a contact member in frictional contact with said vibration member and having a first contact portion and a second contact portion in the contact area for contacting the respective first contact portion and second contact portion of said vibration member, where the first contact portion and the second contact portion of said contact member do not form a continuous contact surface in the contact area, and wherein the second contact portion of said contact member is more deformable than the first contact portion of said contact member, such that the vibration wave causes relative movement between said vibration member and said contact member and a vibration displacement amplitude of the second contact portion of said vibration member is larger than a vibration displacement amplitude of the first contact portion of said vibration member.

17. A vibration driven motor, comprising:
a vibration member that generates a vibration wave therein, the vibration member having a cantilevered support and extending from said support in a predetermined direction, the vibration wave having a displacement amplitude; and
a contact member having a cantilevered contact portion in frictional contact with the contact portion of said vibration member, such that the vibration in the vibration member causes relative movement between said vibration member and said contact member, the contact portion extending in the predetermined direction, such that the vibration wave in said vibration member generates a vibration in the contact member having a response displacement amplitude, and whereby a ratio of the response displacement amplitude of the vibration generated in said contact member to the displacement amplitude of the vibration wave in said vibration member is substantially constant over an entire contact area between the contact portion of said vibration member and the contact portion of said contact member.

18. A motor according to claim 17, wherein said vibration member comprises an elastic member having a pair of linear portions and a pair of arcuate portions, so that one of said linear portions of said elastic member is in contact with said contact portion of said contact member and is moved along said contact member by the vibration wave.

19. A motor according to claim 18, wherein an outer peripheral side of one of said linear portions of said elastic member is located at a distal end portion of a flange formed on said contact member, and an inner peripheral side of said one linear portion is located on a side proximal to said distal end portion of said flange.

20. A motor according to claim 18, wherein an outer peripheral side of one of said linear portions of said elastic member is in contact with a first flange of said contact member, and an inner peripheral side of said one linear portion is in contact with a second flange of said contact member.

21. A printing apparatus using said vibration wave driven motor defined in claim 17 as a drive source.

22. A printing apparatus using said vibration wave driven motor defined in claim 18 as a drive source.

23. A printing apparatus using said vibration wave driven motor defined in claim 19 as a drive source.

24. A printing apparatus using said vibration wave driven motor defined in claim 20 as a drive source.

25. A vibration driven motor, comprising:

a vibration member that generates a vibration wave therein, said vibration member comprising an elastic member having a pair of linear portions and a pair of arcuate portions, one of said linear portions having an inner peripheral side and an outer peripheral side, and said vibration member having a contact portion, the vibration wave having a displacement amplitude; and a contact member having a contact portion in frictional contact with the contact portion of said vibration member, such that the vibration wave in said vibration member generates a vibration in the contact member having a response displacement amplitude and causes relative movement between said vibration member and said contact member, said contact member also having a flange, wherein one of said linear portions of said elastic member is in contact with said contact portion of said contact member and is moved along said contact member by the vibration wave, and wherein the outer peripheral side of said one linear portion is located at a distal end portion of said flange, and the inner peripheral side of said one linear portion is located on a side proximal to said distal end portion of said flange.

26. A printing apparatus using said vibration wave driven motor defined in claim 25 as a drive source.

27. A vibration driven motor, comprising:

a vibration member that generates a vibration wave therein, said vibration member comprising an elastic member having a pair of linear portions and a pair of arcuate portions, one of said linear portions having an inner peripheral side and an outer peripheral side, and said vibration member having a contact portion, the vibration wave having a displacement amplitude; and a contact member having a contact portion in frictional contact with the contact portion of said vibration member, such that the vibration wave in said vibration member generates a vibration in the contact member having a response displacement amplitude and causes relative movement between said vibration member and said contact member, said contact member also having a flange, wherein one of said linear portions of said elastic member is in contact with said contact portion of said contact member and is moved along said contact member by the vibration wave, and wherein an outer peripheral side of said one of said linear portions of said elastic member is in contact with a first flange of said contact member, and an inner peripheral side of said one linear portion is in contact with a second flange of said contact member.

28. A printing apparatus using said vibration wave driven motor defined in claim 27 as a drive source.

* * * * *

UNITED STATES PATENT AND TRADEMARK OFFICE
CERTIFICATE OF CORRECTION

PATENT NO. : 5,945,771
DATED : August 31, 1999
INVENTOR(S): ATSUSHI KIMURA, ET AL.

It is certified that error appears in the above-identified patent and that said Letters Patent is hereby corrected as shown below:

On the title page: Item

[56] FOREIGN PATENT DOCUMENTS

"331137" should read --3-31137--.
"3155375" should read --3-155375-.

Column 5

Line 50, "Portion" should read --portion--.

Column 2

Line 14, "in" should read --of-- and "of each" should read --in each--.

Signed and Sealed this

Sixteenth Day of May, 2000

Attest:

Q. TODD DICKINSON

*Attesting Officer*   *Director of Patents and Trademarks*